US012752225B2

(12) United States Patent
Thivierge et al.

(10) Patent No.: US 12,752,225 B2
(45) Date of Patent: Oct. 6, 2026

(54) AIR-OIL SEPARATOR

(71) Applicant: PRATT & WHITNEY CANADA CORP., Longueuil (CA)

(72) Inventors: Patrick Thivierge, St-Basile-le-Grand (CA); Ritchie Domingo, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 468 days.

(21) Appl. No.: 18/539,485

(22) Filed: Dec. 14, 2023

(65) Prior Publication Data

US 2025/0196037 A1 Jun. 19, 2025

(51) Int. Cl.
*B01D 45/14* (2006.01)
*F02C 7/06* (2006.01)

(52) U.S. Cl.
CPC ................ *B01D 45/14* (2013.01); *F02C 7/06* (2013.01); *F05D 2260/98* (2013.01)

(58) Field of Classification Search
CPC ........ B01D 45/12; B01D 46/00; B01D 46/24; B01D 46/30; B01D 45/14; F01D 25/18; F02C 7/06
See application file for complete search history.

(56) References Cited

U.S. PATENT DOCUMENTS 3,561,195 A 2/1971 Bouru
4,049,401 A 9/1977 Smith
4,981,502 A 1/1991 Gottschalk
5,114,446 A * 5/1992 Giersdorf ................ F01D 25/18
55/438
5,716,423 A 2/1998 Krul et al.
5,776,229 A 7/1998 Blanes et al.
6,033,450 A 3/2000 Krul et al.
(Continued)

FOREIGN PATENT DOCUMENTS

GB 2519977 B 10/2015

OTHER PUBLICATIONS

European Search Report issued in counterpart EP application No. 24219996.6 on Apr. 11, 2025.
(Continued)

*Primary Examiner* — Sharon Pregler
(74) *Attorney, Agent, or Firm* — NORTON ROSE FULBRIGHT CANADA LLP

(57) ABSTRACT

A gearbox de-oiler comprises a housing mounted to a shaft for rotation therewith. The housing defines a chamber containing a porous separator matrix. The chamber has an air-oil mixture inlet, an oil outlet and an air outlet. A separation plate separates the porous separator matrix into a primary flow path segment and a secondary flow path segment. The primary flow path segment extends axially from and fluidly connects the air-oil mixture inlet to a radial passage. The secondary flow path segment extends axially from and fluidly connects the radial passage to the air outlet. The secondary flow path segment axially overlaps the primary flow path segment and is disposed radially inwardly with respect thereto. Oil collector tubes projects radially outwardly from the separation plate across at least a portion of the primary flow path segment for fluidly connecting the secondary flow path segment to the oil outlet.

20 Claims, 4 Drawing Sheets

(56) References Cited

U.S. PATENT DOCUMENTS

| | | | | |
|---|---|---|---|---|
| 6,398,833 | B1 | 6/2002 | Santerre et al. | |
| 6,858,056 | B2 | 2/2005 | Kwan | |
| 6,893,478 | B2 * | 5/2005 | Care | F01M 13/04 55/401 |
| 7,063,734 | B2 | 6/2006 | Latulipe et al. | |
| 8,337,581 | B2 | 12/2012 | Dejaune et al. | |
| 8,657,931 | B2 | 2/2014 | Short et al. | |
| 8,696,779 | B2 | 4/2014 | Belmonte et al. | |
| 8,945,284 | B2 | 2/2015 | Short et al. | |
| 9,028,576 | B2 | 5/2015 | Slayter et al. | |
| 9,370,739 | B2 | 6/2016 | Beier et al. | |
| 9,587,560 | B2 | 3/2017 | Beier et al. | |
| 10,018,087 | B2 | 7/2018 | Prunera-Usach et al. | |
| 10,870,079 | B2 | 12/2020 | Brouillet et al. | |
| 2019/0308129 | A1 * | 10/2019 | Brouillet | B01D 45/14 |
| 2022/0249995 | A1 | 8/2022 | Nifenecker et al. | |

OTHER PUBLICATIONS

An Integrated De-Aerator and Breather Pump and Methods Thereof; the Director General, Defence Research & Development Organisation (DRDO), Ministry of Defence, Government of India, Room No. 348, B-wing, DRDO Bhawan, Rajaji Marg, New Delhi-110011, India.

* cited by examiner

AIR-OIL SEPARATOR

TECHNICAL FIELD

The application relates generally to air-oil separators for separating air from oil of an air-oil mixture.

BACKGROUND OF THE ART

Aircraft engines, such as gas turbine engines, typically have air-oil separators for removing air from oil. Various types and configurations of air-oil separators are known in the art. While these known systems have various benefits, there is still room in the art for improvement.

SUMMARY

In one aspect, there is provided a gearbox de-oiler for an aircraft engine, comprising: a shaft mounted for rotation about an axis; a housing mounted to the shaft for rotation therewith about the axis, the housing defining a chamber containing a porous separator matrix, the chamber having an air-oil mixture inlet, an oil outlet, and an air outlet; a separation plate separating the porous separator matrix into a primary flow path segment and a secondary flow path segment, the primary flow path segment extending axially from and fluidly connecting the air-oil mixture inlet to a radial passage, the secondary flow path segment extending axially from and fluidly connecting the radial passage to the air outlet, the secondary flow path segment axially overlapping the primary flow path segment and disposed radially inwardly with respect thereto; and oil collector tubes projecting radially outwardly from the separation plate across at least a portion of the primary flow path segment, the oil collector tubes fluidly connecting the secondary flow path segment to the oil outlet.

In another aspect, there is provided an air-oil separator for an aircraft engine, comprising: a housing rotatable about a central axis, the housing having an outer and an inner circumferential wall extending axially from a first end wall to a second end wall, the outer and inner circumferential walls and the first and second end walls defining an annular chamber around the central axis, the annular chamber having an inlet defined in the first end wall for receiving an air-oil mixture, and an oil outlet defined in the outer circumferential wall; an annular separation plate projecting axially from the first end wall towards the second end wall inside the annular chamber radially inwardly from the inlet relative to the central axis, the annular separation plate dividing the annular chamber into a radially outer flow path segment and a radially inner flow path segment, the radially inner flow path segment serially connected in flow communication to the radially outer flow path segment and having an air outlet for discharging air extracted from the air-oil mixture received from the radially outer flow path segment; a porous separator matrix disposed in both the radially outer flow path segment and the radially inner flow path segment; and oil collector tubes projecting radially outwardly from the annular separation plate into the radially outer flow path segment towards the oil outlet in the outer circumferential wall of the housing, the oil collector tubes having respective oil inlets defined at a radially inner surface of the annular separation plate.

In a further aspect, there is provided a gearbox de-oiler for an aircraft engine, comprising: a shaft mounted for rotation about an axis; a housing mounted to the shaft for rotation therewith, the housing having an outer circumferential wall, an inner circumferential wall, a first end wall and a second end wall axially opposite to the first end wall, the outer circumferential wall, the inner circumferential wall, the first end wall and the second end wall defining a chamber therebetween, the chamber having an air-oil mixture inlet defined in the first end wall, a series of oil outlet holes defined in the outer circumferential wall, and an air outlet defined in the inner circumferential wall adjacent to the first end wall; a porous separator matrix disposed in the chamber; an annular separation plate extending axially from the first end wall through the porous separator matrix, the annular separation plate disposed radially inwardly from the air-oil mixture inlet, the annular separation plate and the outer circumferential wall defining therebetween a primary flow path segment extending axially from the air-oil mixture inlet towards the second end wall, the annular separation plate and the inner circumferential wall defining therebetween a secondary flow path segment, the secondary flow path segment extending axially from the second end wall to the first end wall and leading to the air outlet; and oil collector tubes extending radially outwardly from the annular separation plate towards the oil outlet holes in the outer circumferential wall, the oil collector tubes configured to collect oil centrifuged against the annular separation plate in the secondary flow path segment and to direct the oil to the oil outlet holes in the outer circumferential wall.

DESCRIPTION OF THE DRAWINGS

Reference is now made to the accompanying figures in which.

DETAILED DESCRIPTION

Figure 1:
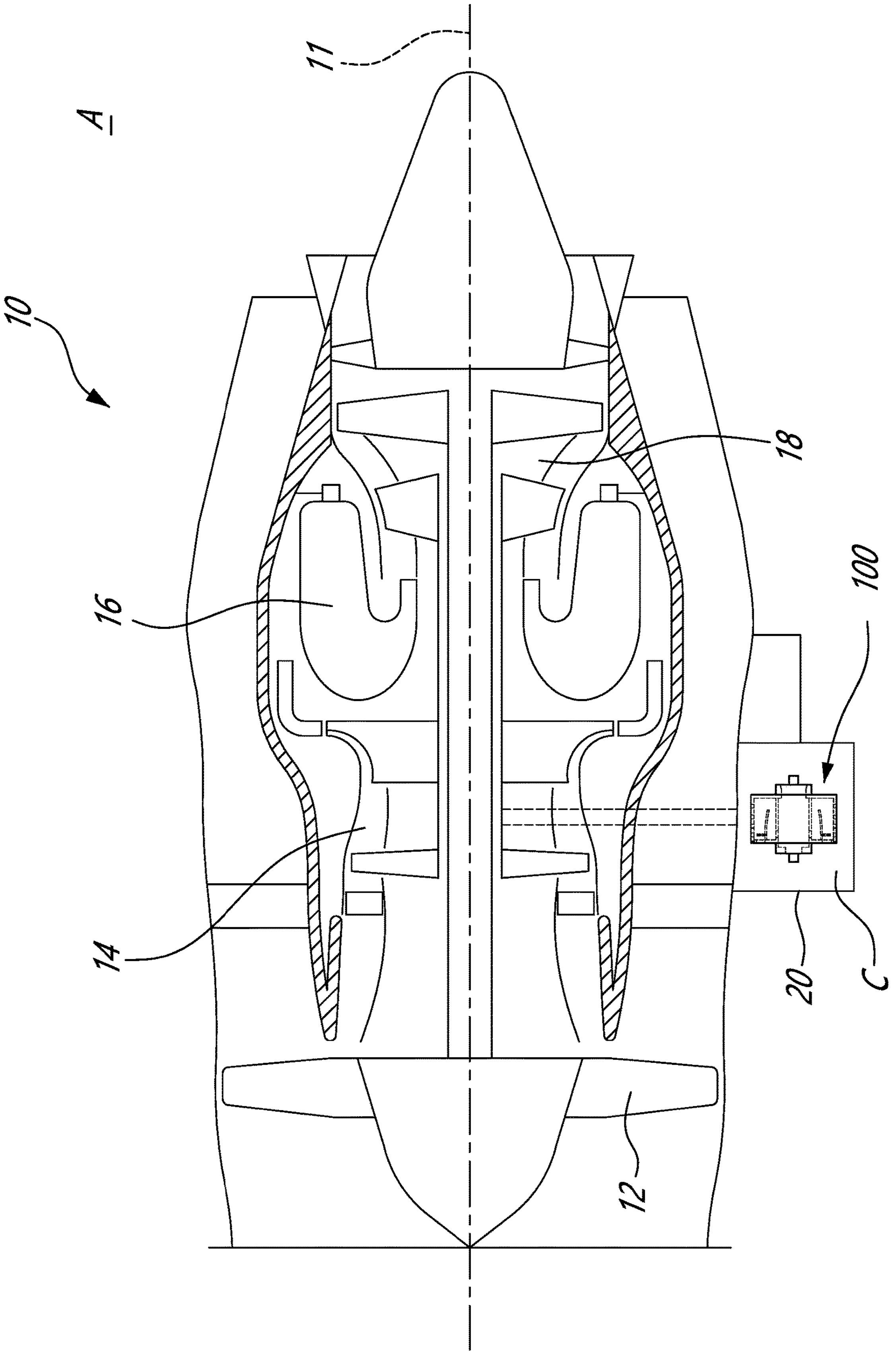
FIG. 1 is a schematic cross section view of an aero-engine having an air-oil separator mounted in an accessory gearbox (AGB)

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The engine 10 further comprises an accessory gearbox 20 drivingly connected to the turbine section 18. Bearings (not shown) are provided for supporting engine rotary components, such as the compressor and turbine shafts for rotation about the engine centerline 11. A lubrication system (not shown) provides lubricant (e.g., oil) to various engine components, such as the bearings and gears. It shall be understood that the aircraft engine illustrated in FIG. 1 is presented by way of example only and the teachings herein can have other applications.

As known in the art, pressurized air, for instance compressor bleed air, may be used to seal the bearing and gearbox cavities. As the air flows through the seals (not shown) of the bearing and gearbox cavities, a certain amount of oil naturally becomes entrained with the air and it is desirable that this oil be separated from the air before the air is vented to the environment.

Figure 2:
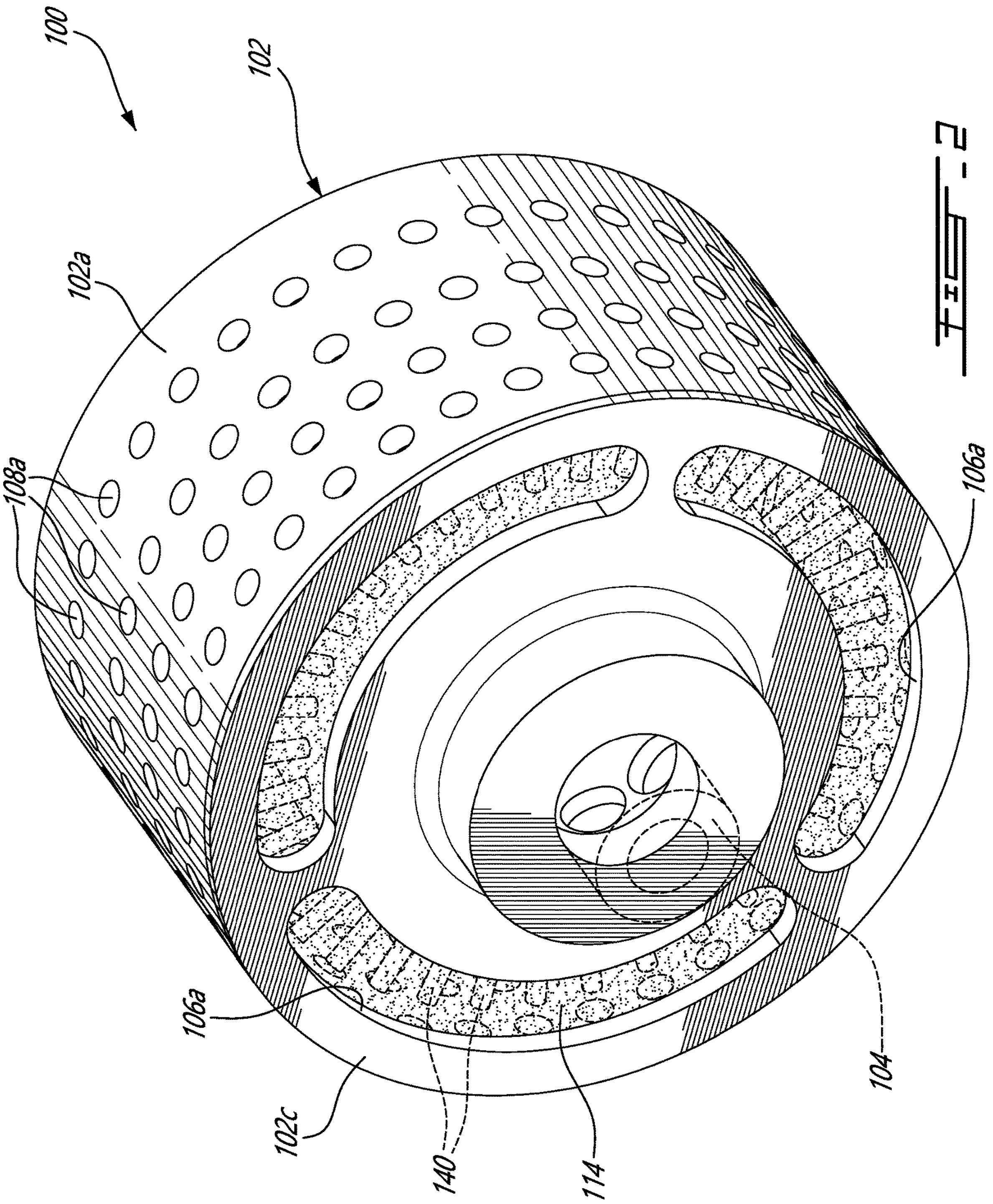
FIG. 2 is a schematic isometric view of the air-oil separator.
Figure 3:
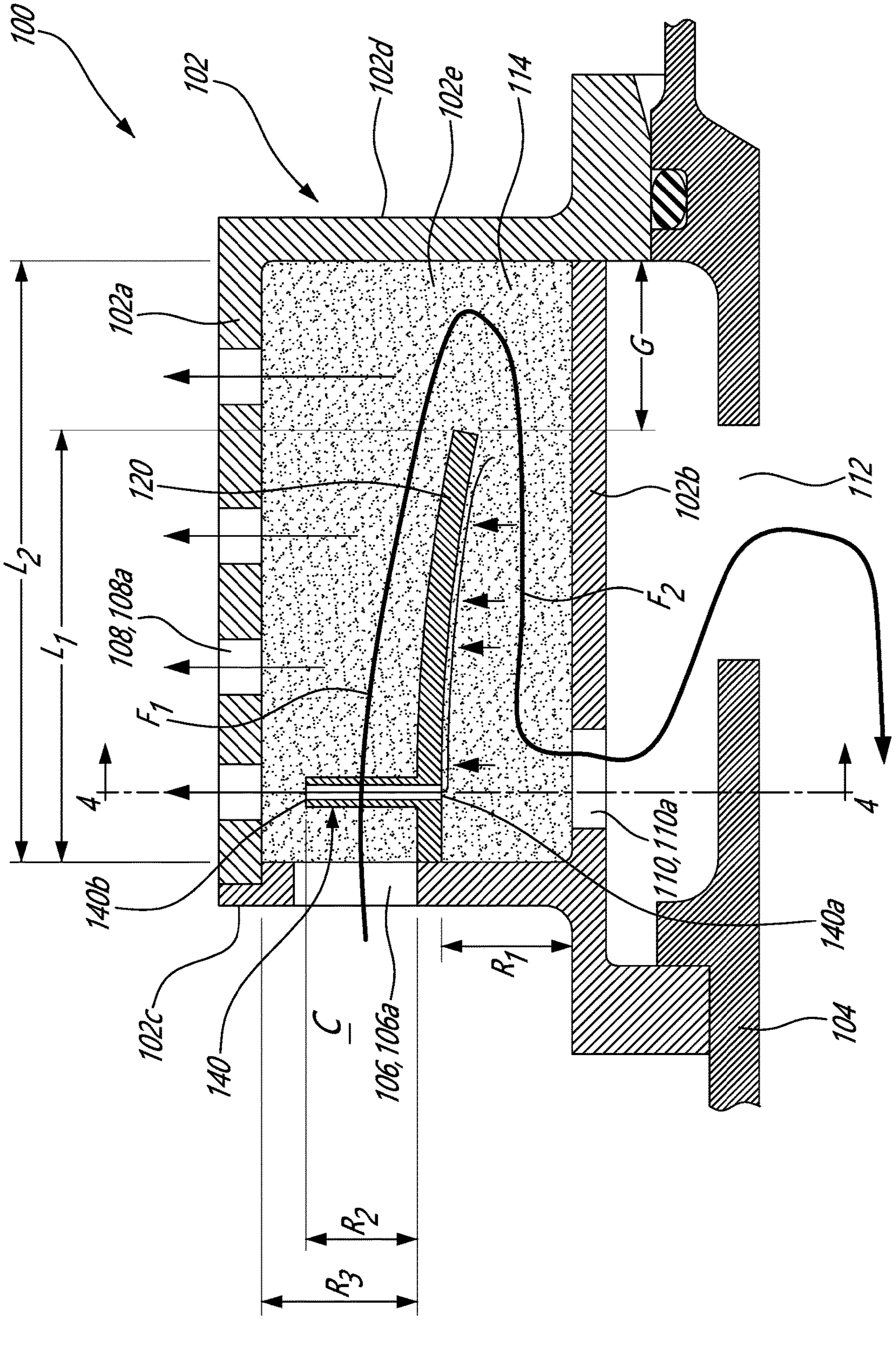
FIG. 3 is a schematic cross-section view of the air-oil separator.
Figure 4:
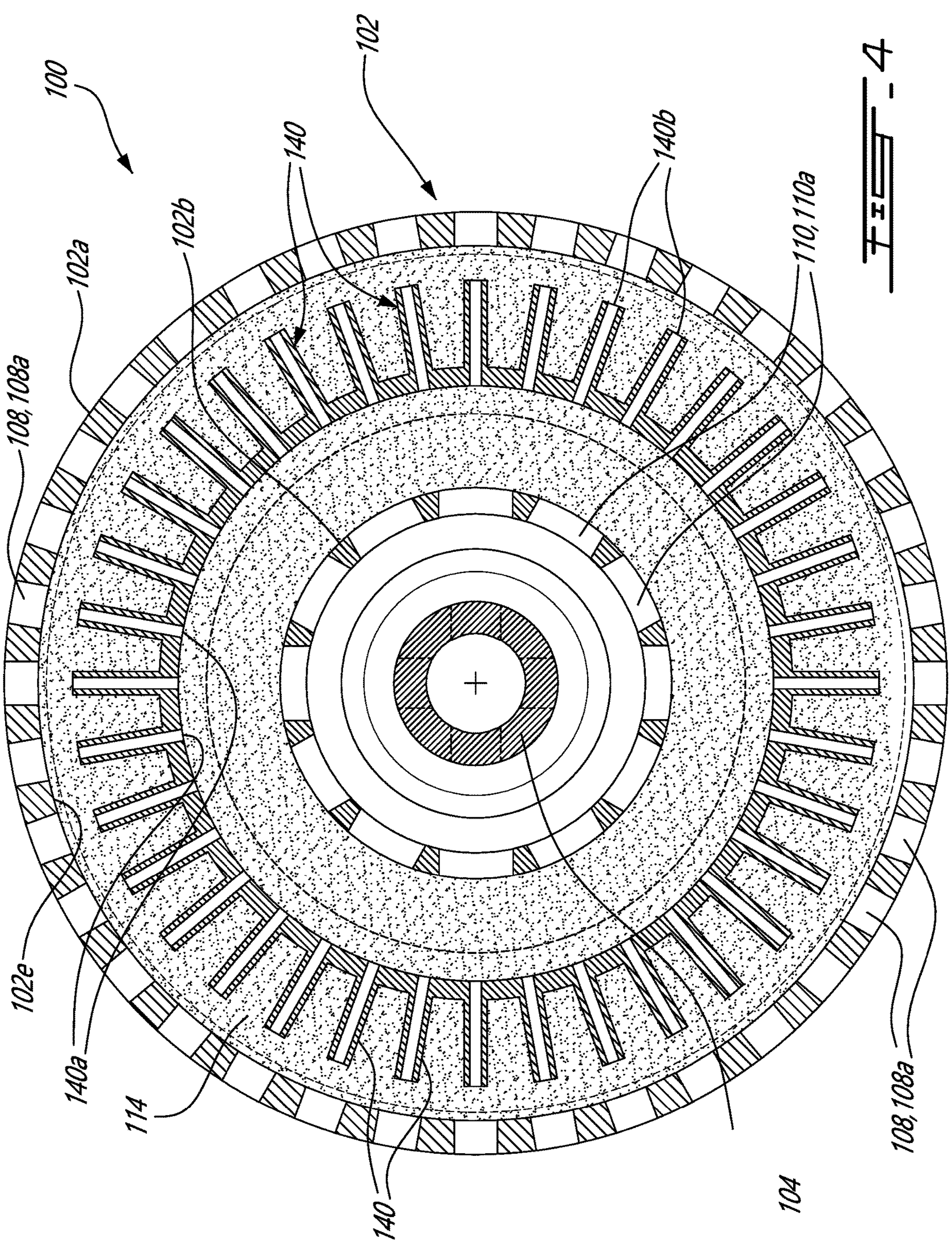
FIG. 4 is a cross-section view taken along line 4-4 in FIG. 3.

FIGS. 2-4 illustrate an air-oil separator 100, also known as a breather or de-oiler, that can be integrated to the engine lubrication system to separate the air from the oil. In this way, retrieved liquid oil can be reused for lubrication and clean air can be expelled to the environment. The air-oil separator thus helps reduce oil consumption, lower emissions, and increase oil recovery. Reducing the amount of oil released in the atmosphere resulting of aircraft engine operation is beneficial for the environment. The air-oil separator also increases the engine autonomy with a reduced oil consumption. Reducing the oil consumption reduces the maintenance intervention required to replenish the oil tank and cost associated with the engine operation which is economically beneficial.

The exemplified air-oil separator 100 is particularly suited for use as a gearbox de-oiler. For instance, the air-oil separator 100 can be integrated to the AGB 20 shown in FIG. 1. According to some embodiments, the air-oil separator 100 may be mounted inside a chamber C of the AGB 20. As will be seen hereinafter, the air-oil separator 100 may be provided in the form of a rotating filter component configured to use the centrifugal action to achieve oil and air separation while the air-oil mixture is forced through a flow path that is more difficult for the oil to navigate than the air. Because liquid oil is heavier than air, it gets separated out and centrifugal forces help drive the oil toward the outside of the separator 100 where it can be expelled. The clean air is then able to vent through an air passage and out to the environment.

Referring now more specifically to FIGS. 2-4, it can be seen that the air-oil separator 100 comprises a housing 102 mounted to a hollow rotating shaft 104 inside the chamber C of the AGB 20 for rotation with the shaft 104 about a central axis. The housing 102 includes an outer circumferential wall **102*a* and an inner circumferential wall 102*b* concentrically disposed about the central axis and extending axially from a first annular end wall 102*c* to a second annular end wall 102*d*. The outer and inner circumferential walls 102*a*, 102*b* and the first and second end walls 102*c*, 102*d* define therebetween an annular chamber 102*e* around the hollow rotating shaft 104. The chamber 102*e* has an air-oil mixture inlet 106 defined in the first end wall 102*c*, an oil outlet 108 defined in the outer circumferential wall 102*a*, and an air outlet 110 defined in the inner circumferential wall 102*b*. As best shown in FIG. 2, the air-oil mixture inlet 106 may include a number of circumferentially spaced-apart axial inlet holes or slots 106*a*. According to the illustrated embodiment, the air-oil mixture inlet 106 comprises a circumferential row of three arcuate inlet slots 106*a* defined in the first end wall 102*c* between the radially outer and radially inner circumferential walls 102*a*, 102*b*. The person skilled in the art will understand that the number and size of the inlet slots 106*a* may vary depending on the engine operating parameters, such as the pressure available for driving the fluid flow through the air-oil separator 100. Still according to the illustrated embodiment, the arcuate inlet slots 106*a* are provided in the radially outer half of the first end wall 102*c* relative to the central axis of the separator 100. Referring to FIGS. 2-4, it can be seen that the oil outlet 108 may comprise a plurality of radial oil exit holes 108*a* defined in the outer circumferential wall 102*a* of the housing 102. The oil exit holes 108*a* may be distributed over the whole surface of the outer circumferential wall 102*a* axially between the first and second end walls 102*c*, 102*d* and circumferentially around a full outer circumference of the housing 102. The air outlet 110 may comprise a circumferential row of radial air exit holes 110*a* in flow communications with one or more corresponding radial aperture(s) 112 defined in the hollow rotating shaft 104. In this way, filtered air may be evacuated centrally through the hollow rotating shaft 104. According to the illustrated embodiment, the air exit holes 110*a* are defined in the inner circumferential wall 102*b* axially adjacent or next to the first end wall 102*c*. As will be seen hereinafter, the axial positioning of the air exit holes 110*a* may be used in combination with other features of the separator to increase the effective flow length of the separator 100**.

As best shown in FIG. 3, the annular chamber **102*e* of the housing 102 is filled with a porous separator matrix 114 configured to act as a coagulator. The porous separator matrix 114 may be provided in the form of a sponge or a mesh material, defining a plurality of intricate micro passages that are in fluid communication with one another. For instance, the separator matrix 114** may include a metal foam material, in which there is a continuous three-dimensional porous structure. Metal foam materials have many useful features such as lighter weight, higher porosity, and larger surface-to-volume ratio.

The separator matrix 114 may be formed into an annular cylindrical body configured to entirely fill the annular chamber **102*e* around the hollow rotating shaft 104. The separator matrix 114 rotates jointly with the housing 102 and the shaft 104 inside the chamber C of the AGB 20. By flowing through the separator matrix 114, the oil in the air-oil mixture coalesce against the material of the separator matrix 114. Via the centrifugal force, the coalesced oil droplets merge radially away from the rotation axis, toward the outer circumferential wall 102*a* of the housing 102 where the oil droplets are discharged back into the chamber C of the AGB 20 via the oil exit holes 108*a*. Simultaneously, the air continues to flow toward a lower pressure zone downstream of the AGB 20 through the air exit holes 110*a* and the aperture(s) 112 located on the hollow rotating shaft 104. The air, with any residual oil, is thus vented through the air outlet 110 and the center of the hollow rotating shaft 104**.

It can be appreciated that the oil content of the air-oil mixture decreases along its passage through the separator matrix 114. The efficiency (i.e., the ability to remove oil from the air-oil mixture) of the air-oil separator 100 is influenced by: 1) the rotational speed of the separator; 2) the metal foam sponge density and 3) the effective flow length. The effective flow length may be defined as the mean distance from the air-oil mixture inlet 106 to the air outlet 110. That is the distance travelled by the air-oil mixture through the separator matrix 114 between inlet 106 an outlet 110.

Accordingly, for a same metal foam sponge density and a same rotational speed, the efficiency of the air-oil separator 100 may be improved by increasing the effective flow length. Indeed, the longer the flow path is, the more efficient the separator can be. However, because of space constrains, there is often a need to minimize the overall axial and radial envelope of the air-oil separator. As will be seen hereinafter, according to at least some embodiments, the effective flow length of the air-oil separator 100 may be increased by creating serially interconnected flow paths within the separator matrix 114 and that without increasing the overall size of the separator. In this way, compact air-oil separators may be provided with greater effective flow length.

For instance, as best shown in FIG. 3, a separation plate 120 may be provided in the chamber **102*e* of the housing 102 to divide the chamber 102***e* and, thus, the separator matrix 114 into a radially outer flow path segment F1 (also herein referred to as a primary flow path segment) and a radially inner flow path segment F2 (also herein referred to as a secondary flow path segment). The separation plate 120 may be provided in the form of an annular or circumferential plate embedded in the separator matrix 114 and extending axially from the first end wall 102*c* toward the second end wall 102*d* of the housing 102 at a radial location radially inward from the air-oil mixture inlet 106. As shown in FIG. 3, an axial length L1 of the separation plate 120 may be less than an axial length L2 of the chamber 102*e* to create an axial gap G between the distal end of the separation plate 120 and the second end wall 102*d* of the chamber 102*e*. The axial gap G forms a radial passage fluidly connecting the radially outer flow path segment F1 to the radially inner flow path segment F2. In this way, the air-oil mixture can flow from the air-oil mixture inlet 106 through the radially outer or primary flow path segment F1 toward the second end wall 102*d* of the housing 102 and then pass radially inwardly to the radially inner or secondary flow path segment F2 where the air and any residual oil can flow in an opposite axial direction toward the first end wall 102*c* in order to enable further air-oil separation before the filtered air is discharged through the air outlet 110 at the very end of the radially inner or secondary flow path segment F2. Creating such a secondary flow path segment F2 significantly increases the effective flow length of the separator, thereby providing greater potential for the oil to coagulate.

It is understood that the axial length of the gap G and, thus, the axial length L1 of the separation plate 120 relative to the axial length L2 of the chamber 102*e* may vary from engine to engine, notably depending upon the pressure differential between the air-oil mixture inlet 106 and the air outlet 110. According to some embodiments, the separation plate 120 could also extend fully across the chamber 102*e* to the second end wall 102*d* (i.e., L1=L2) and radial holes could be defined in the separation plate 120 at an axial location adjacent or next to the second end wall 102*d* of the housing 102 to provide a fluid passage between the primary and secondary flow paths F1, F2.

As can be appreciated from FIG. 3, the axial length of the secondary flow path segment F2 can be adjusted by changing the relative axial positioning of the axial gap G (i.e., the radial interconnecting passage between the primary and secondary flow path segments F1, F2) and the air outlet 110. Indeed, by positioning the radial interconnecting passage and the air outlet 110 at the opposed axial ends of the chamber 102*e*, the flow path length of the secondary flow path segment F2 can be maximized. However, it is understood that depending on the engine and the pressure drop across the separator 100, the axial length of the secondary flow path segment F2 can be reduced by positioning the air outlet 110 and/or the radial interconnecting passage further away from the first and second end walls 102*c*, 102*d*, respectively.

According to the embodiment illustrated in FIG. 3, the separation plate 120 is radially disposed at a distance R1 from the inner circumferential wall 102*b* of the chamber 102*e* so that the radially outer surface of the separation plate 120 at an axial location adjacent the first end wall 102*c* is substantially flush/leveled with the radially inner end of the air-oil mixture inlet 106. However, it is understood that the radial distance R1 could be less. In other words, the separation plate 120 could be disposed further radially inwardly from the air-oil mixture inlet 106. In this way, the relative radial height of the primary and secondary flow paths F1 and F2 could be varied as needed.

In addition to creating the secondary flow path segment F2, the separation plate 120 also acts as an oil collector. Indeed, the radially inner surface of the separation plate 120 provides a surface to collect the oil droplets that are coalesced in the secondary flow path segment F2 and flow radially outwards under the centrifugal effect. The plate 120 may be configured to promote oil flow towards the first end wall 102*c* to collect the oil through a set of oil collector tubes 140. As shown in FIG. 3, the separation plate 120 may have a radially inner diameter that increases from a minimum value to a maximum value towards the first end wall 102*c*. This encourages collected oil along the radially inner surface of the plate 120 to travel toward the first end wall 102*c* where the oil collector tubes 140 are located. According to the illustrated embodiment, the oil collector tubes 140 are disposed where the radially inner diameter of the separator plate 120 is at its maximum. Still according to the illustrated embodiment, this axial location is adjacent to the first end wall 102*c* at the downstream end of the secondary flow path segment F2. By so positioning the oil collector tubes 140 and configuring the plate 120 to guide de centrifuged oil to the downstream end of the second flow path segment F2, additional opportunities to extract oil from the air-oil mixture can be obtained.

Still referring to FIG. 3, the separation plate 120 may curve radially inwardly in an axial direction away from the first end wall 102*c*. This can be used to provide the inner diameter variation to guide the centrifuged oil droplets in the desired axial direction along the radially inner surface of the separation plate 120, while allowing the adjustment of the cross-section profile of the primary and secondary flow path segments F1, F2. For instance, according to the illustrated embodiment, the radial height of the primary flow path segment F1 gradually increases in an axial direction away from the first end wall 102*c*, whereas the radial height of the secondary flow path segment F2 increases towards the first end wall 102*c*. This may be used to adjust the pressure delta in the different flow path segments. According to another possible configuration, the annular separation plate 120 could have a frusto-conical profile instead of being curved as shown in FIG. 3.

The purpose of the oil collector tubes 140 is to collect coagulated oil from the secondary flow path segment F2 and to direct it to the oil exit holes 108*a* in the outer circumferential wall 102*a* of the housing 102. If only exit holes were incorporated in the plate 120, there is a risk of some recirculation of the oil along the primary and secondary flow path segments F1, F2. The oil collector tubes 1140 reduces the risk of oil recirculation and further maximizes the efficiency of the air-oil separator 100. Referring to FIGS. 3 and 4, it can be appreciated that the oil collector tubes 140 may include a circumferential row/array of tubes projecting radially outwardly from the separation plate 120. According to the illustrated embodiment, only one circumferential row is provided. However, it is understood that more than one row could be provided axially along the separation plate 120. Also, the distribution of the tubes 140 around the separation plate 120 can differ from the illustrated example. For instance, the oil collector tubes 140 could be angularly offset relative to the air-oil mixture inlet slots 106*a* and the number of tubes and the disposition thereof around the separation plate 120 can vary from engine to engine.

Each oil collector tubes 140 has an inlet 140*a* defined in the radially inner surface of the separation plate 120 for collecting coagulated oil centrifuged against the radially inner surface of the separation plate 120 and an outlet 140*b* for directing the collected oil to the oil exit holes 108*a* in the primary flow path segment F1. According to the illustrated embodiment, the oil collector tubes 140 are embedded in the separator matrix 114 and have a radial height R2 which is less than the radial height R3 of the primary flow path segment F1 at the axial location of the oil collector tubes 140. That is the tubes 140 do not extend all the way to the oil exit holes 108*a*, but are rather spaced by a predetermined distance from the inner surface of the outer circumferential wall 102*a*). The oil collected from the secondary flow path F2 is thus discharged from the tubes 140 into the separator matrix 114, but close (i.e., in the radially outer half of the primary flow path segment F1) to the radial oil exit holes 108*a* to minimize the risk of recirculation. However, it is understood that the collector tubes 140 could extend all the way to the oil exit holes 108*a* such that collected oil from the secondary path segment F2 is not returned to the separator matrix 114, thereby eliminating any potential recirculation of oil through both the primary and secondary flow paths F1, F2.

The collector tubes 140 may be clocked or aligned with the oil exit holes 108*a* defined in the outer circumferential wall 102*a* of the housing 102 of the separator 100. This may provide more direct passage of the oil from the collector tubes 140 to the oil exit holes 108*a*. From the foregoing, it can be appreciated that numerous parameters of the tubes, such as the number of tubes, the inner diameter of the tubes, the length of the tubes, the position and distribution of the tubes, can be varied to optimize efficiency.

It is understood that more than one set of separation plate and associated oil collector tubes could be provided in the chamber 102*e* to extend the effective flow length of the air-oil separator 100. The plates and their respective sets of tubes could be axially staggered to define a serpentine passage through the separator matrix 114. For instance, a second plate could extend axially from the second end wall 102*d* at a radial location spaced radially inwardly from the first plate to create a third flow path segment leading to the air outlet 110. Various configurations are contemplated. Also, the separator plate and the associated oil collector tubes could be retrofitted to an existing air-oil separator.

In operation, the air-oil mixture flowing into the air-oil separator 100 via the inlet 106 is pressed into the porous separator matrix 114. As the mixture axially flows along the primary flow path segment F1, a first portion of the oil contained in the mixture is captured by the framework of the matrix 114 and discharged through the oil exits holes 108*a* by the centrifugal force. The air and residual oil flow through the secondary flow path segment F2, where a further portion of the oil is coagulated in the separator matrix 114 and centrifuged against the radially inner surface of the separation plate 120. The coagulated oil flows axially along the radially inner surface of the plate 120 towards the oil collector tubes 140. From the tubes 140, the additional oil collected from the secondary flow path segment F2 is discharged into the separator matrix 114 at a radial location close to the oil exit holes 10. The centrifugal force causes the oil discharged from the tubes 140 to flow from the separator matrix 114 to the oil exit holes 108*a* before being discharged from the separator 100. The de-oiled air flows to the downstream end of the secondary flow path F2 where it is vented via the air outlet 110 and the center of the shaft 104.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the air-oil separator has been described as part of an AGB, it is understood that it could be integrated to another gearbox or oil chamber of an engine. Also, while the engine has been shown as a turbofan engine, it is understood that the air-oil separator could be used on different types of engines, including a turboshaft engine, a turboprop engine, and an auxiliary power engine to name a few. Yet further modifications could be implemented by a person of ordinary skill in the art in view of the present disclosure, which modifications would be within the scope of the present technology.

The invention claimed is:

1. A gearbox de-oiler for an aircraft engine, comprising:

a shaft mounted for rotation about an axis;

a housing mounted to the shaft for rotation therewith about the axis, the housing defining a chamber containing a porous separator matrix, the chamber having an air-oil mixture inlet, an oil outlet, and an air outlet;

a separation plate separating the porous separator matrix into a primary flow path segment and a secondary flow path segment, the primary flow path segment extending axially from and fluidly connecting the air-oil mixture inlet to a radial passage, the secondary flow path segment extending axially from and fluidly connecting the radial passage to the air outlet, the secondary flow path segment axially overlapping the primary flow path segment and disposed radially inwardly with respect thereto; and oil collector tubes projecting radially outwardly from the separation plate across at least a portion of the primary flow path segment, the oil collector tubes fluidly connecting the secondary flow path segment to the oil outlet.

2. The gearbox de-oiler according to claim 1, wherein the separation plate and the oil collector tubes are embedded in the porous separator matrix.

3. The gearbox de-oiler according to claim 1, wherein the separation plate curves radially inwardly towards the axis in an axial direction away from the air-oil mixture inlet.

4. The gearbox de-oiler according to claim 1, wherein the separation plate has a radially inner diameter which decreased in an axial direction away from the air-oil mixture inlet, and wherein the oil collector tubes are provided on the separation plate at an axial location where the radially inner diameter is maximal.

5. The gearbox de-oiler according to claim 4, wherein the air outlet is defined at the axial location in a radially inner wall of the housing.

6. The gearbox de-oiler according to claim 1, wherein the oil collector tubes project radially outwardly to a radial location which is in a radially outer half of the primary flow path segment.

7. The gearbox de-oiler according to claim 1, wherein the oil collector tubes are circumferentially distributed around the separation plate and disposed axially adjacent to the air-oil mixture inlet.

8. An air-oil separator for an aircraft engine, comprising:

a housing rotatable about a central axis, the housing having an outer and an inner circumferential wall extending axially from a first end wall to a second end wall, the outer and inner circumferential walls and the first and second end walls defining an annular chamber around the central axis, the annular chamber having an inlet defined in the first end wall for receiving an air-oil mixture, and an oil outlet defined in the outer circumferential wall;

an annular separation plate projecting axially from the first end wall towards the second end wall inside the annular chamber radially inwardly from the inlet relative to the central axis, the annular separation plate dividing the annular chamber into a radially outer flow path segment and a radially inner flow path segment, the radially inner flow path segment serially connected in flow communication to the radially outer flow path segment and having an air outlet for discharging air extracted from the air-oil mixture received from the radially outer flow path segment;

a porous separator matrix disposed in both the radially outer flow path segment and the radially inner flow path segment; and oil collector tubes projecting radially outwardly from the annular separation plate into the radially outer flow path segment towards the oil outlet in the outer circumferential wall of the housing, the oil collector tubes having respective oil inlets defined at a radially inner surface of the annular separation plate.

9. The air-oil separator according to claim 8, wherein a radially inner diameter of the annular separation plate gradually decreases in an axial direction away from the first end wall.

10. The air-oil separator according to claim 9, wherein the radially inner diameter varies from a minimum value to a maximum value, and wherein the oil collector tubes are located at an axial location along the annular separation plate where the radially inner diameter has a value greater than the minimum value.

11. The air-oil separator according to claim 9, wherein the oil collector tubes are disposed at an axial location where the radially inner diameter of the annular separation plate is at its maximum value.

12. The air-oil separator according to claim 10, wherein the axial location is adjacent to the first end wall.

13. The air-oil separator according to claim 8, wherein the annular separation plate curves radially inwardly in an axial direction away from the first end wall.

14. The air-oil separator according to claim 13, wherein the annular separation plate has an axial length which is less than that of the annular chamber.

15. The air-oil separator according to claim 14, wherein the oil collector tubes include a circumferential array of oil collector tubes axially adjacent to the first end wall of the housing.

16. The air-oil separator according to claim 8, wherein the oil collector tubes extend radially into the radially outer flow path segment to a radial location contained in a radially outer half of the radially outer flow path segment.

17. The air-oil separator according to claim 8, wherein the oil collector tubes are embedded in the porous separator matrix and in flow communication therewith.

18. The air-oil separator according to claim 17, wherein the porous separator matrix includes a metal foam material.

19. The air-oil separator according to claim 8, wherein the air outlet of the radially outer flow path segment is located axially adjacent to the first end wall of the housing, and wherein the air outlet is defined in the inner circumferential wall of the housing.

20. A gearbox de-oiler for an aircraft engine, comprising:

a shaft mounted for rotation about an axis;

a housing mounted to the shaft for rotation therewith, the housing having an outer circumferential wall, an inner circumferential wall, a first end wall and a second end wall axially opposite to the first end wall, the outer circumferential wall, the inner circumferential wall, the first end wall and the second end wall defining a chamber therebetween, the chamber having an air-oil mixture inlet defined in the first end wall, a series of oil outlet holes defined in the outer circumferential wall, and an air outlet defined in the inner circumferential wall adjacent to the first end wall;

a porous separator matrix disposed in the chamber;

an annular separation plate extending axially from the first end wall through the porous separator matrix, the annular separation plate disposed radially inwardly from the air-oil mixture inlet, the annular separation plate and the outer circumferential wall defining therebetween a primary flow path segment extending axially from the air-oil mixture inlet towards the second end wall, the annular separation plate and the inner circumferential wall defining therebetween a secondary flow path segment, the secondary flow path segment extending axially from the second end wall to the first end wall and leading to the air outlet; and oil collector tubes extending radially outwardly from the annular separation plate towards the oil outlet holes in the outer circumferential wall, the oil collector tubes configured to collect oil centrifuged against the annular separation plate in the secondary flow path segment and to direct the oil to the oil outlet holes in the outer circumferential wall.

* * * * *